(12) United States Patent
Martin et al.

(10) Patent No.: US 9,470,162 B2
(45) Date of Patent: Oct. 18, 2016

(54) METHOD AND SYSTEM FOR EGR CONTROL

(71) Applicant: Ford Global Technologies, LLC, Dearborn, MI (US)

(72) Inventors: Douglas Raymond Martin, Canton, MI (US); Freeman Carter Gates, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 88 days.

(21) Appl. No.: 14/327,379

(22) Filed: Jul. 9, 2014

(65) Prior Publication Data

US 2015/0192078 A1  Jul. 9, 2015

Related U.S. Application Data

(60) Provisional application No. 61/924,188, filed on Jan. 6, 2014.

(51) Int. Cl.
*F02B 47/08* (2006.01)
*F02D 41/00* (2006.01)
*F02M 35/10* (2006.01)

(52) U.S. Cl.
CPC ......... *F02D 41/005* (2013.01); *F02D 41/0065* (2013.01); *F02M 26/44* (2016.02); *F02D 2041/0017* (2013.01); *F02M 35/10222* (2013.01); *Y02T 10/47* (2013.01)

(58) Field of Classification Search
CPC .................. F02M 25/0722; F02M 35/10222; F02M 25/0724; F02M 25/0751; F02M 25/0703
USPC ..................................................... 123/568.17
See application file for complete search history.

(56) References Cited

U.S. PATENT DOCUMENTS

| | | | | |
|---|---|---|---|---|
| 4,766,853 A | * | 8/1988 | Iwanami | F02B 27/02 123/184.36 |
| 5,279,515 A | | 1/1994 | Moore et al. | |
| 5,653,202 A | * | 8/1997 | Ma | F02B 29/00 123/184.43 |
| 5,746,189 A | | 5/1998 | Kuzuya et al. | |

(Continued)

FOREIGN PATENT DOCUMENTS

WO   2014005127 A2   1/2014

OTHER PUBLICATIONS

Potteau, Sebastian et al., "Cooled EGR for a Turbo SI Engine to Reduce Knocking and Fuel Consumption," SAE Technical Paper Series No. 2007-01-3978, Powertrain & Fluid Systems Conference and Exhibition, Rosemont, Ill., Oct. 29-Nov. 1, 2007, 13 pages.

(Continued)

*Primary Examiner* — Lindsay Low
*Assistant Examiner* — Charles Brauch
(74) *Attorney, Agent, or Firm* — Julia Voutyras; Alleman Hall McCoy Russell & Tuttle LLP

(57) ABSTRACT

Methods and systems are provided for improving control of high dilution EGR. An intake plenum is divided so that fresh intake air and EGR can be delivered to engine cylinders via dedicated plenum portions. Distinct sets of throttles are provided in the cylinder intake ports coupled the different plenum portions so that a ratio of intake air flow and EGR flow to the engine cylinders can be rapidly adjusted in response to sudden changes (e.g., increase or decrease) in EGR demand.

18 Claims, 6 Drawing Sheets

(56) References Cited

U.S. PATENT DOCUMENTS

| | | |
|---|---|---|
| 6,053,154 A | 4/2000 | Pott |
| 6,138,650 A | 10/2000 | Bailey |
| 6,230,695 B1 | 5/2001 | Coleman et al. |
| 6,293,246 B1 | 9/2001 | Tanahashi et al. |
| 6,397,790 B1 | 6/2002 | Collier, Jr. |
| 6,405,720 B1 | 6/2002 | Collier, Jr. |
| 6,499,449 B2 | 12/2002 | Michelini et al. |
| 6,543,230 B1 | 4/2003 | Schmid |
| 6,655,324 B2 | 12/2003 | Cohn et al. |
| 6,820,415 B2 | 11/2004 | Abet et al. |
| 6,925,802 B2 | 8/2005 | Arnold |
| 6,968,825 B2 | 11/2005 | Hitomi et al. |
| 7,290,504 B2 | 11/2007 | Lange |
| 7,779,812 B2 | 8/2010 | Leone et al. |
| 7,942,127 B2 | 5/2011 | Leone et al. |
| 8,041,500 B2 | 10/2011 | Leone |
| 8,108,125 B2 | 1/2012 | Leone |
| 8,150,605 B2 | 4/2012 | Doering et al. |
| 8,239,122 B2 | 8/2012 | Leone et al. |
| 8,291,891 B2 | 10/2012 | Alger, II et al. |
| 8,352,160 B2 | 1/2013 | Leone |
| 8,352,164 B2 | 1/2013 | Leone et al. |
| 8,511,084 B2 | 8/2013 | Ulrey et al. |
| 8,539,768 B2 | 9/2013 | Hayman et al. |
| 8,561,599 B2 | 10/2013 | Gingrich et al. |
| 8,701,409 B2 | 4/2014 | Pursifull et al. |
| 8,763,570 B2 | 7/2014 | Hayman et al. |
| 2002/0023620 A1* | 2/2002 | Paffrath ............... F02D 9/1095 123/336 |
| 2009/0308070 A1 | 12/2009 | Alger, II et al. |
| 2011/0041495 A1 | 2/2011 | Yager |
| 2011/0253113 A1 | 10/2011 | Roth et al. |
| 2012/0023937 A1 | 2/2012 | Styles et al. |
| 2012/0078492 A1 | 3/2012 | Freund et al. |
| 2012/0204844 A1 | 8/2012 | Gingrich et al. |
| 2012/0260897 A1 | 10/2012 | Hayman et al. |
| 2012/0285163 A1 | 11/2012 | Hayman et al. |
| 2012/0285426 A1 | 11/2012 | Hayman et al. |
| 2012/0285427 A1 | 11/2012 | Hayman et al. |

OTHER PUBLICATIONS

Alger, Terry et al., "Dedicated EGR: A New Concept in High Efficiency Engines," SAE Technical Paper Series No. 2009-01-0694, Southwest Research Institute, 12 pages.

Boyer, Brad A. et al., "Devices and Methods for Exhaust Gas Recirculation Operation of an Engine," U.S. Appl. No. 13/744,281, filed Jan. 17, 2013, 33 pages.

Ulrey, Joseph N. et al., "Dedicated EGR Cylinder Post Combustion Injection," U.S. Appl. No. 13/915,245, filed Jun. 11, 2013, 34 pages.

Leone, Thomas G. et al., "Systems and Methods for Dedicated EGR Cylinder Valve Control," U.S. Appl. No. 14/297,232, filed Jun. 5, 2014, 36 pages.

Leone, Thomas G. et al., "Systems and Methods for EGR Control," U.S. Appl. No. 14/298,733, filed Jun. 6, 2014, 45 pages.

Leone, Thomas G. et al., "Systems and Methods for Improving Operation of a Highly Dilute Engine," U.S. Appl. No. 14/271,248, filed May 6, 2014, 40 pages.

Glugla, Chris P., "Systems and Methods for Boost Control," U.S. Appl. No. 14/307,165, filed Jun. 17, 2014, 56 pages.

* cited by examiner

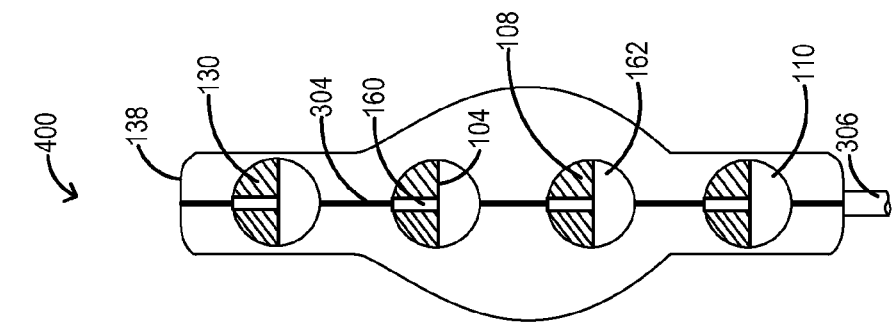
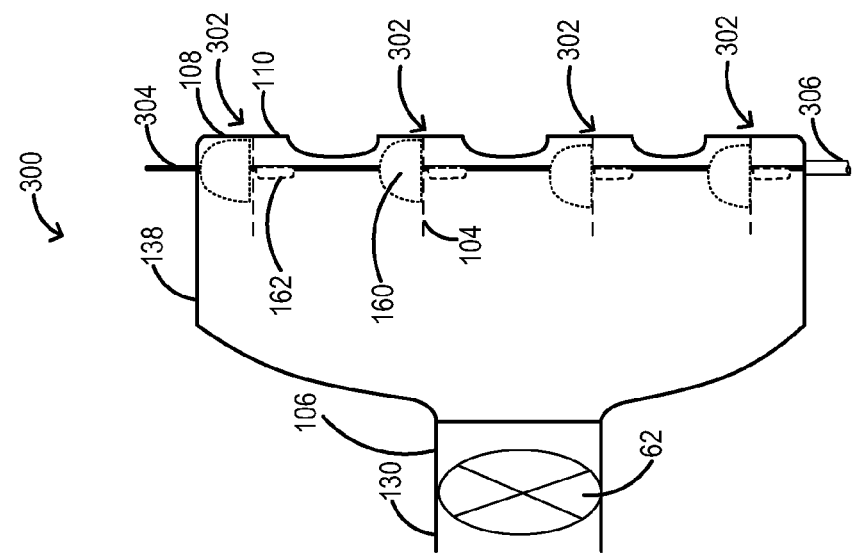
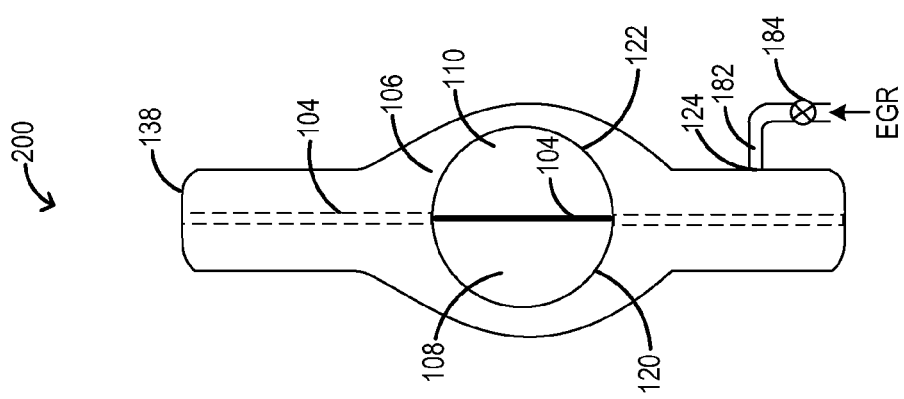

METHOD AND SYSTEM FOR EGR CONTROL

CROSS REFERENCE TO RELATED APPLICATIONS

The present application claims priority to U.S. Provisional Patent Application No. 61/924,188, "METHOD AND SYSTEM FOR EGR CONTROL," filed on Jan. 6, 2014, the entire contents of which are hereby incorporated by reference for all purposes.

FIELD

The present application relates to methods and systems for improving dilution control in an internal combustion engine.

BACKGROUND AND SUMMARY

Exhaust gas recirculation (EGR) systems divert a portion of the exhaust gases back to the intake to cool combustion temperatures and reduce throttling losses, thus improving vehicle emissions and fuel economy. In turbocharged engines, an EGR system may include a cooled low-pressure EGR (LP-EGR) circuit wherein exhaust gases are diverted after the gases pass through the turbine of the turbocharger and injected before the compressor upon passage through an EGR cooler. Additionally, the EGR system may include a cooled high-pressure EGR (HP-EGR) circuit wherein exhaust gases are diverted before the gases pass through the turbine of the turbocharger and injected downstream of the compressor upon passage through an EGR cooler. The amount of EGR (HP-EGR and/or LP-EGR) routed through the EGR system is measured and adjusted based on engine speed and load during engine operation to maintain desirable combustion stability of the engine while providing emissions and fuel economy benefits.

One example EGR system is shown by Styles et al. in US 20120023937. Therein, LP-EGR is provided at a fixed EGR percentage rate of fresh airflow over a large area of an engine map, including from mid-load down to minimum engine load, even as engine load changes. At higher engine loads, the EGR percentage rate is varied based on engine operating conditions. In addition, at very low engine loads and/or engine idle conditions, no EGR (0% EGR) may be delivered. Such an approach improves transient control and extends the use of EGR over a wider range of operating conditions.

However the inventors herein have identified potential issues with EGR systems. As an example, when high rates of EGR are present and low rates of EGR are requested (such as during selected "full" tip-ins), the delay to reach high torque may be unacceptably long. This may be, at least in part, due to the long transport delay in EGR evacuating the intake system as the exhaust gases have to clear from the intake manifold before a full charge of pure air reaches the combustion chamber to produce maximum possible torque. To mitigate the delay in producing the maximum torque, the maximum level of EGR is reduced under steady state conditions, increasing knock, inefficient use of spark retard or combustion mixture enrichment may be required degrading fuel economy, and offsetting the fuel economy benefits of the prior EGR usage.

As another example, when low rates of EGR are present and high rates of EGR are requested (such as during selected partial tip-ins), the delay to reach high EGR dilution may be unacceptably long. This may be, at least in part, due to the long transport delay in EGR filling the intake system as the exhaust gases have to travel though the turbocharger compressor, high-pressure air induction plumbing, charge air cooler, and intake manifold before reaching the combustion chamber. The delay in EGR entering the combustion chamber can also lead to combustion instability, and knock. To mitigate the knock, inefficient use of spark retard or combustion mixture enrichment may be required degrading fuel economy, and offsetting the fuel economy benefits of the prior EGR usage. The abnormal combustion events can also erode drive cycle fuel efficiency and potentially damage the engine.

As a further example, when high rates of EGR are present and low rates of EGR are requested (such as during selected tip-outs), the delay in EGR purging from the air intake system can lead to the presence of residual EGR dilution at low load conditions. The presence of increased intake dilution at low loads can increase combustion instability issues and the propensity for engine misfires. While the flat schedule of Styles may reduce the likelihood of high EGR amounts at lower engine loads, the schedule may also limit the fuel economy benefits of EGR. For example, the flat EGR schedule may result in LP-EGR being provided at some low load points where no fuel economy benefits from EGR are achieved. In some cases, there may even be a fuel penalty associated with the delivery of LP-EGR at the low load point. As another example, the lower EGR at the lower load points may limit the peak EGR rates achievable during subsequent higher load engine operation. The delayed purging of EGR requiring EGR in the engine intake system at low engine loads can also render the intake compressor susceptible to corrosion and condensation. Furthermore, increased condensation may occur at the charge air cooler of a boosted engine system due to the flow of EGR through the cooler. The increased condensation may necessitate additional counter-condensation measures which further reduce engine efficiency and fuel economy.

Some of the above mentioned issues may be addressed by a method for an engine that has an intake plenum that is divided along the entire length from an inlet (coupled to an intake passage) to an outlet coupled to individual cylinder intake ports. One example method comprises: delivering at least intake air into engine cylinders via a first section of a divided intake plenum, delivering at least EGR into engine cylinders via a second, different, section of the divided intake plenum; and adjusting relative flow from each section to the cylinders via valves between the plenum and the cylinders. In this way, engine dilution can be rapidly increased or decreased in the engine to meet the change in EGR demand.

As an example, an engine intake plenum may be divided along the entire length of the plenum, from an inlet (where air is drawn) to an outlet (where flow is delivered to individual cylinders). The plenum may be divided by a divider into a first, upper and a second, lower plenum portion. The lower plenum portion may selectively be coupled to an EGR passage and may be configured to deliver a mixture of air and EGR to the engine cylinders. An amount of EGR in the mixed charge of the lower plenum portion may be controlled by adjusting an opening of an EGR valve coupled in the EGR passage. The upper plenum portion may not be coupled to the EGR passage and thus may be configured to deliver only fresh intake air to the engine cylinders.

During steady-state conditions, a first set of throttle valves coupling the upper plenum portion to the intake port of each engine cylinder may be held closed while a second set of throttle valves coupling the lower plenum portion to the intake port of each engine cylinder may be opened so that a nominal mixture of air and EGR may be delivered to engine cylinders via the lower plenum portion. In response to a decrease in EGR demand to 0% EGR conditions, such as due to a large operator pedal tip-out or an operator pedal tip-in to wide open throttle, a ratio of flow through the plenums may be adjusted to provide the desired dilution as soon as possible. Specifically, the first set of throttle valves coupled to the upper plenum portion may be fully opened while the second set of throttle valves coupled to the lower plenum portion may be fully closed so as to immediately increase the flow of fresh air into the cylinder while also reducing the flow of EGR into the cylinders. The first and second set of throttle valves may be oriented perpendicularly on a commonly actuated shaft such that the opening of one is coordinated with the closing of the other. Alternatively, each set of throttle valves may be independently actuated. By adjusting the valves to adjust the relative flow of fresh air and EGR into the cylinders via distinct portions of a common intake plenum, a faster drop in EGR into the cylinders is enabled than would otherwise have been possible.

In an alternate example, if a rapid change (e.g., decrease) in EGR is demanded while operating in the steady state conditions, such as a change from high EGR conditions to medium EGR conditions, the first set of throttle valves may be partially opened while the second set of throttle valves is partially closed. The EGR valve may then be adjusted based on the EGR demand and the opening of the first and second throttle valves to provide the desired EGR flow into the second lower plenum portion. Once the desired EGR flow is achieved, the first set of throttle valves may be fully closed to disallow further ingestion of fresh air into the cylinders via the upper plenum portion. Concurrently, the second set of throttle valves may be fully opened to allow the desired engine dilution and flow to be delivered to the engine cylinders via the lower plenum portion.

In this way, rapid increases or decreases in EGR demand can be met, reducing issues associated with delays in EGR delivery or purging. By using a divided intake plenum having a distinct portions for delivering fresh air charge and EGR mixed air charge to engine cylinders, engine dilution adjustments can be expedited. By using an intake plenum that is divided along the entire length, the need for distinct intake passages is reduced, providing benefits associated with component reduction. By adjusting the relative flow into the different plenum portions via adjustments to throttle valves, the delivery of EGR and air can be properly coordinated. Overall, dilution adjustments can be expedited, improving engine performance.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 2 shows a left hand side view of an example embodiment of the divided intake plenum of the engine of FIG. 1 having plenum portion throttle valves configured on a commonly actuated shaft.

FIG. 3 shows a top view of the divided intake plenum of FIG. 2.

FIG. 4 shows a right hand side view of the divided intake plenum of FIG. 2.

DETAILED DESCRIPTION

Figure 1:
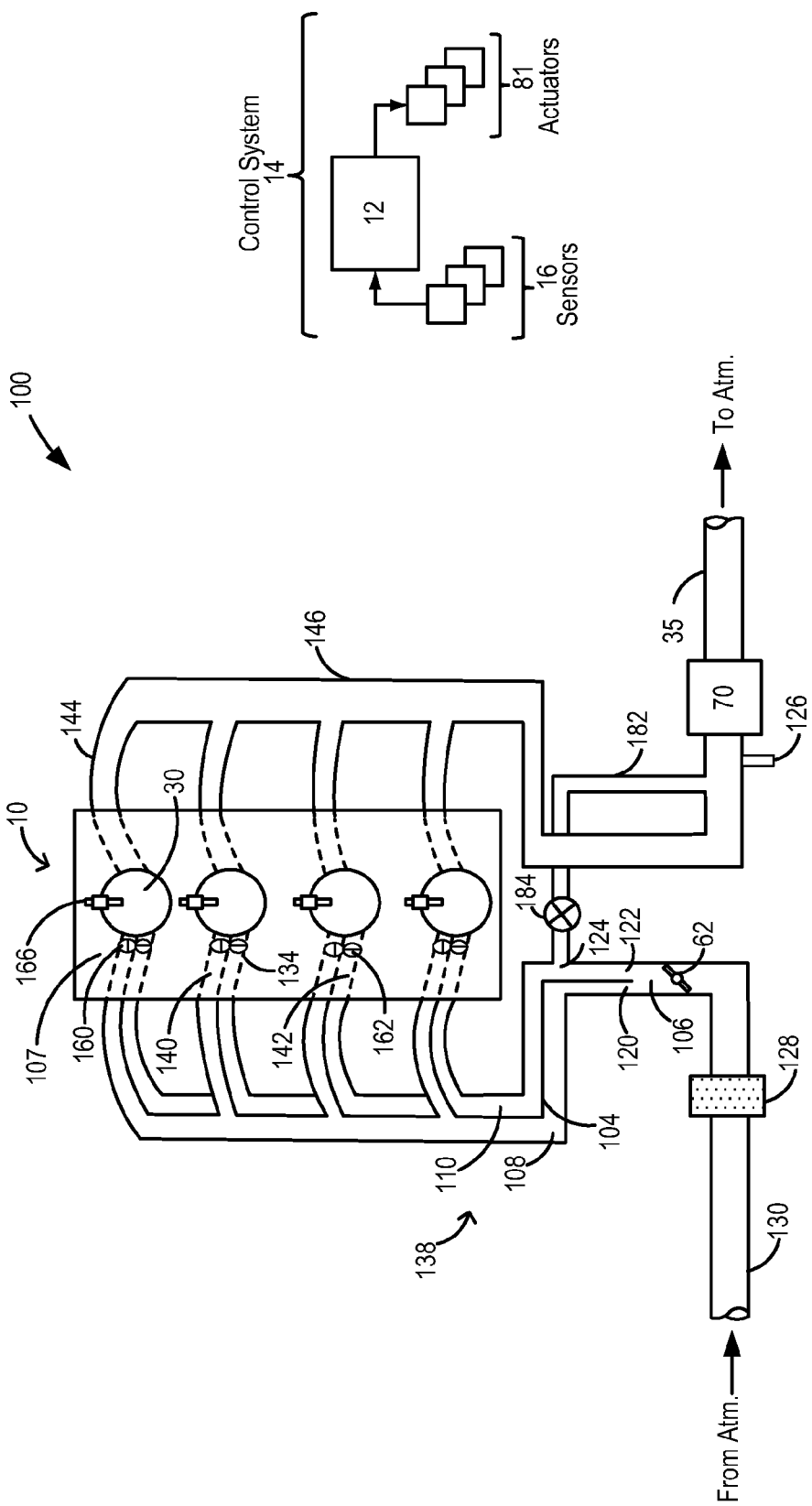
FIG. 1 shows a schematic diagram of an embodiment of an engine with a turbocharger and an exhaust gas recirculation system.

Methods and systems are provided for reducing the delay in delivering EGR when high EGR rates are requested, and likewise, reducing the delay in purging EGR when low EGR rates are requested, in an engine system, such as the engine system of FIG. 1. An intake manifold with a divided plenum, such as the divided plenum of FIG. 2-4, or 5-7, may be used to deliver fresh air and exhaust gas to engine cylinders. Specifically, fresh air may be delivered through a first plenum portion while EGR is delivered though a second, different plenum portion. A controller may be configured to perform a control routine, such as the routine of FIGS. 8-9, to adjust the position of a first set of throttle valves coupled to the first plenum portion, upstream of an intake of the engine cylinders, to vary an amount of fresh air delivered to the engine cylinders while concurrently adjusting the position of a second set of throttle valves coupled to the second plenum portion, to vary an amount of EGR delivered to the engine cylinders. By varying the ratio, engine dilution can be rapidly increased or decreased, as required. Example adjustments are shown at FIG. 10.

Turning to FIG. 1, it shows a schematic depiction of an example turbocharged engine system 100 including a multi-cylinder internal combustion engine 10. As a non-limiting example, engine system 100 can be included as part of a propulsion system for a passenger vehicle. Engine 10 may include a plurality of cylinders 30. In the depicted example, engine 10 includes four cylinders arranged in an in-line configuration. However, in alternate examples, engine 10 can include two or more cylinders such as 3, 4, 5, 6, 8, 10 or more cylinders, arranged in alternate configurations, such as V, boxed, etc.

Each cylinder 30 may be configured with a fuel injector 166. In the depicted example, fuel injector 166 is a direct in-cylinder injector. Direct injector 166 may be configured as a side injector, or may be located overhead of the piston. The overhead position may improve mixing and combustion when operating the engine with an alcohol-based fuel due to the lower volatility of some alcohol-based fuels. Alternatively, the injector may be located overhead and near the intake valve to improve mixing. In alternate examples, injector 166 may be a port injector providing fuel into the intake port 134 upstream of cylinder 30. Further still, cylinder 30 may include a direct fuel injector and a port fuel injector.

Cylinder 30 can have a compression ratio, which is the ratio of volumes when a cylinder piston is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug (not shown) for initiating combustion. An ignition system can provide an ignition spark to combustion chamber 30 via the spark plug in response to a spark advance signal from controller 12, under select operating modes. However, in some embodiments, the spark plug may be omitted, such as where engine 10 may initiate combustion by auto-ignition or by injection of fuel as may be the case with some diesel engines.

Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. Fuel tanks in fuel system 8 may hold fuel with different fuel qualities, such as different fuel compositions. These differences may include different alcohol content, different octane, different heat of vaporizations, different fuel blends, and/or combinations thereof etc. In some embodiments, fuel system 8 may be coupled to a fuel vapor recovery system including a canister for storing refueling and diurnal fuel vapors. The fuel vapors may be purged from the canister to the engine cylinders during engine operation when purge conditions are met. For example, the purge vapors may be naturally aspirated into the cylinder via the first intake passage at or below barometric pressure.

Engine 10 includes an engine intake passage 130 for receiving fresh air. An air filter 128 is included in intake passage 130 for filtering the received air. The intake passage then connects into a divided engine intake plenum 138. Intake plenum 138 has an inlet 106 at an upstream end coupled to intake passage 130, downstream of intake throttle 62, for drawing in fresh intake air. Intake plenum 138 further has an outlet 107 (elaborated at FIGS. 2-4) coupled to the intake port 134 of individual engine cylinders 30 at a downstream end. Divided engine intake plenum 138 further includes a divider 104 which divides the intake plenum into a first plenum portion 108 (also known as first plenum section) and a second plenum portion 110 (also known as second plenum section). In one example, the first plenum portion 108 is divided from, and parallel to, second plenum portion 110. Divider 104 spans the entire length of the intake plenum 138 from the inlet 106 to the outlet 107. In one example, the divider divides the intake plenum into upper and lower portions from the inlet to the outlet wherein the first plenum section is one of the upper and lower portions and wherein the second plenum section is a remaining one of the upper and lower portions. For example, the first plenum portion 108 may be an upper plenum portion while the second plenum portion 110 may be a lower plenum portion.

The position of throttle 62 can be adjusted by control system 14 via a throttle actuator (not shown) communicatively coupled to controller 12. By modulating throttle 62, an amount of fresh air may be inducted from the atmosphere into engine 10 and delivered to the engine cylinders at or below barometric (or atmospheric) pressure.

Exhaust gases generated during cylinder combustion events may be exhausted from each cylinder 30 along respective exhaust ports 144 into a common (undivided) exhaust passage 146. Exhaust gas flowing through exhaust passage 146 may be treated by emission control device 70 before being discharged to the atmosphere along tailpipe 35. Emission control device 70 may include one or more exhaust catalysts such as three-way catalysts, lean NOx traps, oxidation catalysts, reduction catalysts, etc., or combinations thereof.

Exhaust gas sensor 126 is shown coupled to exhaust passage 148. Sensor 126 may be positioned in the exhaust passage upstream emission control device 70. Sensor 126 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc.

Engine 10 may further include an exhaust gas recirculation (EGR) passage 182 for recirculating at least a portion of exhaust gas from exhaust passage 146 to intake passage 130, specifically into intake plenum 138. In particular, exhaust passage 146 may be communicatively coupled to second intake plenum portion 110 but not to first intake plenum portion 108, via EGR passage 182 including EGR valve 184. In some embodiments, EGR passage 182 may further include an EGR cooler (not shown) for lowering a temperature of exhaust residuals flowing through the EGR passage before recirculation into the engine intake. An engine controller may be configured to adjust an opening of EGR valve 184 to recirculate an amount of exhaust gas at or below atmospheric pressure to the second intake plenum section 110, thereby enabling low-pressure EGR (LP-EGR) to be diverted from the exhaust passage to the engine cylinders. As elaborated below, by coordinating the timing and degree of opening of EGR valve 184 with the timing and degree of opening of throttle valves coupled to the first and second intake plenum portions, EGR rates can be rapidly increased or decreased in response to changes in EGR demand.

First and second intake plenum portions 108, 110 are configured to deliver air of different compositions to engine cylinders 30. Specifically, the first (e.g., upper) portion 108 of the intake plenum 138 is configured to draw fresh air from intake passage 130 and deliver only fresh intake air to each engine cylinder 30. In comparison, second (e.g., lower) portion 110 of the intake plenum 138 is configured to draw fresh air from intake passage 130 and exhaust residuals from EGR passage 112 and deliver a mixture of air and exhaust residuals (that is, EGR) to each engine cylinder 30. Specifically, air and EGR may be mixed in the second plenum portion, at a location near inlet 106 before the mixed air is delivered to the engine cylinders. Thus, each cylinder 30 of engine 10 is configured to receive an intake aircharge including only fresh air at intake port 134 via first intake plenum portion 108, and receive exhaust residuals at intake port 134 via second intake plenum portion 110.

Divider 104 may divide the intake plenum such that each plenum portion has distinct inlets. Specifically, first plenum portion 108 may have a first inlet 120 for drawing fresh air via intake passage 130 and a plurality of outlets 140 coupled to the intake part 134 of the distinct engine cylinders 30 for delivering only fresh air to the cylinders. Likewise, second plenum portion may have a second inlet 122 (distinct from the first inlet) for drawing fresh air via intake passage 130, and a third inlet 124 positioned downstream of the second inlet for drawing exhaust gas from EGR passage 182. Fresh air and exhaust residuals may be mixed in second plenum portion 110, downstream of third inlet 124, before the mixture of fresh air and exhaust gas is delivered to the engine cylinders via a plurality of outlets 142 coupled to the distinct engine cylinders. The composition of air delivered through the second intake plenum portion may be adjusted by controlling the opening of EGR valve 184 in EGR passage 182. Specifically, opening of EGR valve 184 may be adjusted to adjust an amount of exhaust residuals delivered to the second plenum portion 110. For example, by increasing the opening of EGR valve 184, the dilution of air in the second plenum portion can be increased.

Flow of fresh air delivered to engine cylinders via the first plenum portion may be controlled via a first set of throttle valves 160 coupled to the plurality of outlets 140 of the first plenum portion 108. Likewise, flow of mixed air delivered to engine cylinders via the second plenum portion may be controlled via a second set of throttle valves 162 coupled to the plurality of outlets 142 of the second plenum portion 110. The second set of throttle valves 162 may be oriented perpendicular to the first set of throttle valves 160. Thus, when the first set of throttle valves are in an open position, the second set of throttle valves may be in a closed position, and vice versa.

In one example, as elaborated at FIGS. 2-4, the first set of throttle valves and the second set of throttle valves may be configured on a commonly actuated shaft. Therein, by actuating a common actuator coupled to the shaft, an opening of the first set of throttle valves can be increased while the opening of the second set of throttle valves is correspondingly, and concurrently, decreased (or vice versa). In an alternate example, as elaborated with reference to FIGS. 5-7, each of the first and second set of throttle valves may be controlled via distinct actuators. This configuration allows for independent control of the divided intake plenum sections. For example, both the first and second sections may be opened. As another example, the opening of the first section may be increased slowly while the opening of the second section is increased or decreased rapidly.

By using a divided intake plenum configured to selectively delivery fresh air via one of the divided plenum portions and mixed air containing exhaust residuals via the other divided plenum portion, engine dilution adjustments can be rapidly performed and the desired engine dilution can be provided substantially immediately. As elaborated with reference to FIGS. 8-9, in response to engine transients requiring a rapid increase in EGR, engine dilution delivery can be increased by shutting of delivery of fresh air to engine cylinders via the first plenum portion while increasing delivery of mixed air to engine cylinders via the second plenum portion. EGR flow rates can be adjusted via concurrent adjustments to the EGR valve. Likewise, in response to engine transients requiring a rapid decrease in EGR, engine dilution delivery can be decreased by shutting of delivery of mixed air to engine cylinders via the second plenum portion while increasing delivery of fresh air to engine cylinders via the first plenum portion. EGR flow rates can be adjusted via concurrent adjustments to the EGR valve.

Returning to FIG. 1, engine system 100 may be controlled at least partially by a control system 14 including controller 12. Control system 14 is shown receiving information from a plurality of sensors 16 (various examples of which are described herein) and sending control signals to a plurality of actuators 81. As one example, sensors 16 may include intake air pressure and temperature sensors (MAP sensors and MAT sensors) coupled to the intake passage. Other sensors may include a throttle inlet pressure (TIP) sensor for estimating a throttle inlet pressure (TIP) and/or a throttle inlet temperature sensor for estimating a throttle air temperature (TCT) coupled downstream of the throttles in each intake passage. In other examples, the EGR passage may include pressure, temperature, and air-to-fuel ratio sensors, for determining EGR flow characteristics. As another example, actuators 81 may include fuel injector 166, EGR valve 184, intake air throttle 62, first set of throttle valves 160 and second set of throttle valves 162. Other actuators, such as a variety of additional valves and throttles, may be coupled to various locations in engine system 100. Controller 12 may receive input data from the various sensors, process the input data, and trigger the actuators in response to the processed input data based on instruction or code programmed therein corresponding to one or more routines. Example control routines are described herein with regard to FIGS. 8-9.

Controller 12 may be a microcomputer, including a microprocessor unit, input/output ports, an electronic storage medium for executable programs and calibration values (such as read only memory chip), random access memory, keep alive memory, and a data bus. Storage medium read-only memory can be programmed with computer readable data representing instructions executable by the processor for performing the methods and routines described below as well as other variants that are anticipated but not specifically listed.

Now turning to FIGS. 2-4, various views of a first embodiment of the divided intake plenum is shown. Specifically, a first (left hand side) view 200 of the divided intake plenum is shown looking into the plenum from the intake throttle. A second top view 300 of the divided intake plenum is shown looking into the different plenum portions from a top of the intake plenum. Finally, a third (right hand side) view 400 of the divided intake plenum is shown looking into the plenum from the intake ports of the cylinders. In the embodiment depicted at FIGS. 2-4, the first and second set of throttle valves are arranged in a perpendicular arrangement on a common shaft so as to allow for use of a common actuator. As such, components introduced earlier in FIG. 1 are numbered similarly and not reintroduced.

FIG. 2 shows a first (left hand side) view 200 looking in towards the intake plenum 138 from the intake throttle, at inlet 106 of the intake plenum. That is, the view depicts the intake plenum when looked at from the inlet end. Divider 104 is shown dividing intake plenum 138 along the length of the plenum into a first portion 108 and a second portion 110. In the depicted example, the view of the throttle includes a view of a first inlet 120 of first plenum portion 108 and a second inlet 122 of second plenum portion 110. In the depicted example, divider 104 divides the intake plenum such that first plenum portion 108 is on the left hand side while second plenum portion is on the right hand side. Each of the first and second intake plenum portions are configured to receive fresh air from an intake passage, via the intake throttle. Second intake plenum portion 110 is further configured to receive EGR from EGR passage 182 at inlet 124.

An amount of exhaust residuals received in second intake plenum portion 110 is controlled by adjusting the opening of EGR valve 184.

FIG. 3 shows a top view 300 of intake plenum 138. The plenum is shown receiving fresh air in each of the plenum portions from intake passage 130 via throttle 62. A relative amount of only fresh air received in the first plenum portion 108 of each intake port 302 is adjusted via changes to the position of a first set of throttle valves 160. Likewise, a relative amount of mixed air (including a mixture of fresh air and EGR) received in the second plenum portion 110 of each intake port 302 is adjusted via changes to the position of second set of throttle valves 162. The first and second plenum portions are shown separated by divider 104. In the embodiment depicted at FIGS. 2-4, first set of throttle valves 160 and second set of throttle valves 162 are arranged on a common shaft 304 and actuated by a common actuator 306. The common shaft 304 is configured perpendicular to the plane of divider 104. In particular, the divider may be perpendicular to a ground plane in the intake ports 302 and parallel to the ground plane in the rest of the intake plenum. Thus, the divider may have a twisted configuration through the intake manifold. Further, the first and second throttle valves are arranged in a perpendicular orientation relative to one another on common shaft 304. Thus, by actuating common actuator 306, common shaft 304 may be rotated so as to move first set of throttle valves 160 in a first direction while moving the second set of throttle valves 162 in a different direction. In the depicted example, the second set of throttle valves 162 are in a position that blocks or occludes flow of mixed air into intake port 302. Thus, the second intake plenum portion is closed at the intake port 302 and no exhaust residuals may be received in each cylinder via the second intake plenum portion. Further, the first set of throttle valves 160 are in a position that enables or includes flow of mixed air into intake port 302. Thus, the first intake plenum portion is open at the intake port 302 and an amount of fresh air may be received in each cylinder via the first intake plenum portion.

The configuration of the valves on a commonly actuated shaft provides various benefits. For example, the single shaft approach reduces the possibility of timing control issues that could arise if the timing of closing of the first set of throttle valves is not properly coordinated with the opening of the second set of throttle valves, or vice versa. As such, timing irregularities may result in grossly disrupted airflow and loss of fuel economy.

FIG. 4 shows a third (right hand side) view 400 looking in towards the intake plenum 138 from the intake ports of the cylinders. That is, the view depicts the intake plenum when looked at from the outlet end. As shown at FIG. 3, divider 104 is shown dividing intake plenum 138 into a first portion 108 and a second portion 110 in the same plane as common shaft 304 on which first set of throttle valves 160 and second set of throttle valves 162 are arranged. Common actuator 306 is actuated to rotate the second set of throttle valves 162 to a position that blocks or occludes flow of mixed air containing exhaust residuals into intake port 302. In the example view of FIG. 4, the second set of throttle valves are in a plane perpendicular to the axis of common shaft 304. Thus, the second intake plenum portion is closed at the intake port 302 and no exhaust residuals may be received in each cylinder via the second intake plenum portion. Further, the first set of throttle valves 160 are in a position that enables or includes flow of fresh air into intake port 302. In the example view of FIG. 4, the first set of throttle valves are in the same plane as the axis of common shaft 304. Thus, the first intake plenum portion is open at the intake port 302 and an amount of fresh air may be received in each cylinder via the first intake plenum portion. Intake passage 130, represented by dark lines, may be visible behind the open first set of throttle valves in the first plenum portion 108 when looking into intake plenum 138 from the intake port. It will be appreciated that as first set of throttle valves 160 is moved to a position that blocks or occludes flow of fresh air into intake port 302, the second set of throttle valves 162 may be concurrently moved (at the same rate and by the same degree) to a position that enables or includes flow of exhaust residuals into intake port 302.

Thus, in the single-shaft configuration, the air-only passage plate position (that is, of the first set of throttle valves) is mechanically coupled to be the complement of the mixed passage plate position (that is, of the second set of throttle valves). Example plate position combinations are listed below in Table 1.

TABLE 1

Example plate position combinations for a single shaft configuration

| Plate position for first set of throttle valves | Plate position for second set of throttle valves |
|---|---|
| 100% open | 0% open |
| 25% open | 75% open |
| 50% open | 50% open |
| 75% open | 25% open |
| 100% open | 0% open |

Figure 7:
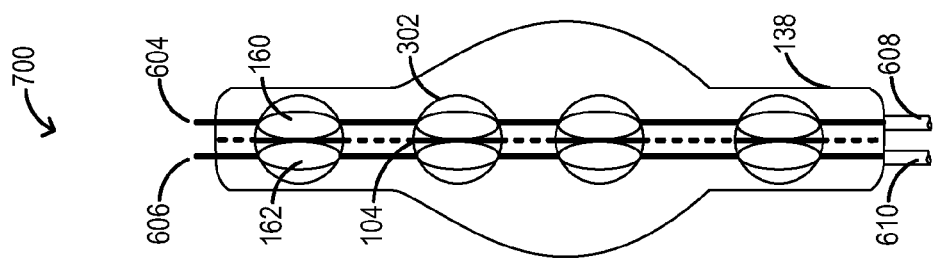
FIGS. 5-7 show left hand side, top, and right hand side views of an alternate embodiment of the divided intake plenum having plenum portion throttle valves configured on independently actuated shafts.
Figure 6:
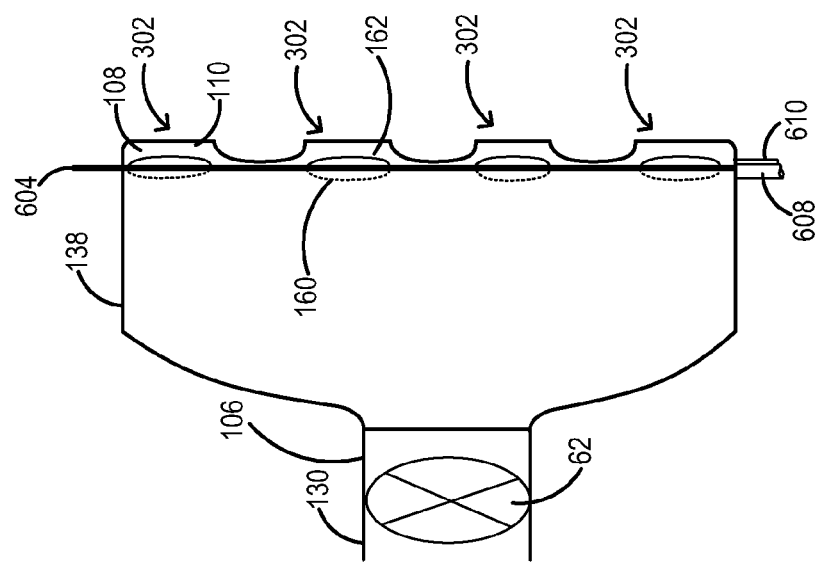
Figure 5:
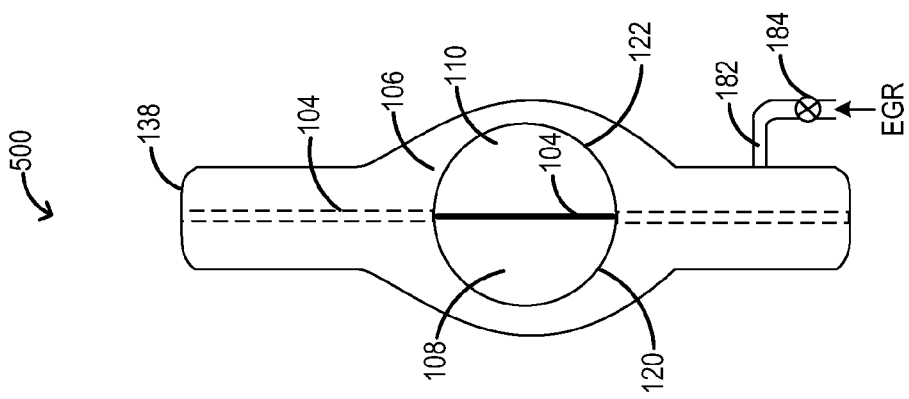

Now turning to FIGS. 5-7, various views of a second embodiment of the divided intake plenum is shown. Specifically, a first (left hand side) view 500 of the divided intake plenum is shown looking into the plenum from the intake throttle. A second top view 600 of the divided intake plenum is shown looking into the different plenum portions from a top of the intake plenum. Finally, a third (right hand side) view 700 of the divided intake plenum is shown looking into the plenum from the intake ports of the cylinders. In the embodiment depicted at FIGS. 5-7, the first and second set of throttle valves are arranged on distinct shafts so as to allow for independent control. As such, components introduced earlier in FIGS. 1-4 are numbered similarly and not reintroduced.

As discussed at FIG. 2, FIG. 5 shows a first (left hand side) view 500 looking in towards the intake plenum 138 at an inlet end, from the intake throttle at inlet 106 of the intake plenum. As such, the view of the intake plenums at the inlet end may be the same for embodiments where the throttle valves are arranged on a common actuator as compared to the throttle valves arranged on independent actuators.

FIG. 6 shows a top view 600 of intake plenum 138. As discussed at FIG. 3, the plenum is shown receiving fresh air in each of the plenum portions from intake passage 130 via throttle 62. Further, a relative amount of only fresh air received in the intake port of each cylinder via first plenum portion 108 is adjusted via changes to the position of a first set of throttle valves 160. The first set of throttle valves are arranged on a first shaft 604, arranged in the same plane as divider 104. The first shaft may be rotated via adjustments to a first actuator 608. Likewise, a relative amount of mixed air (including a mixture of fresh air and EGR) received in the intake port of each cylinder via second plenum portion 110 is adjusted via changes to the position of second set of throttle valves 162. The second set of throttle valves are arranged on a second shaft, distinct from first shaft 604. As such, the first and second shafts are arranged in a common plane and thus the second shaft may not be visible in the top view. In addition, since the first and second shafts are in the same plane as the divider, the divider may also not be visible in the top view. The second shaft may be rotated via adjustments to a second actuator 610.

The first set of throttle valves 160 and the second set of throttle valves 162 may be arranged on their respective shafts in a parallel or perpendicular orientation relative to one another. Thus, by actuating first actuator 608 in coordination with second actuator 610, first shaft 604 may rotate and move first set of throttle valves 160 in a first direction while the second shaft moves and rotates the second set of throttle valves 162 in the same or a different direction. In the depicted example, the second set of throttle valves 162 are in a position that allows flow of mixed air into intake port 302. Thus, the second intake plenum portion is open at the intake port 302 and exhaust residuals may be received in each cylinder via the second intake plenum portion. Further, the first set of throttle valves 160 are in a position that enables flow of mixed air into intake port 302. Thus, the first intake plenum portion is open at the intake port 302 and an amount of fresh air may be received in each cylinder via the first intake plenum portion.

The configuration of the valves on independently actuated shafts allows for independent control. In addition, it allows for both throttles to be opened at the same time. For example, during selected conditions, both throttle valves may be shifted to a fully open position. Further, it allows for one set of throttle valves to be rotated at a different speed relative to the other set of throttle valves. For example, the first set of throttle valves may be opened faster than the second set of throttle valves.

FIG. 7 shows a third (right hand side) view 700 looking in towards the intake plenum 138 from the intake ports of the cylinders. That is, the view depicts the intake plenum when looked at from the outlet end. As shown at FIG. 3, divider 104 is shown dividing intake plenum 138 into a first portion 108 and a second portion 110 in the same plane as first shaft 604 and second shaft (not visible but below first shaft 604 in the same plane). The first set of throttle valves 160 are arranged on first shaft 604 while second set of throttle valves 162 are arranged on the second shaft. First actuator 608 is actuated to rotate the first set of throttle valves 160 to a position, as depicted, that opens or enables flow of fresh air containing exhaust residuals into intake port 302. Thus, the first intake plenum portion is open at the intake port 302 and fresh air may be received in each cylinder via the first intake plenum portion. Further, second actuator 610 is actuated to rotate the second set of throttle valves 162 to a position that opens or enables flow of mixed air into intake port 302. Thus, the second intake plenum portion is open at the intake port 302 and an amount of exhaust residuals may be received in each cylinder via the second intake plenum portion.

Figure 8:
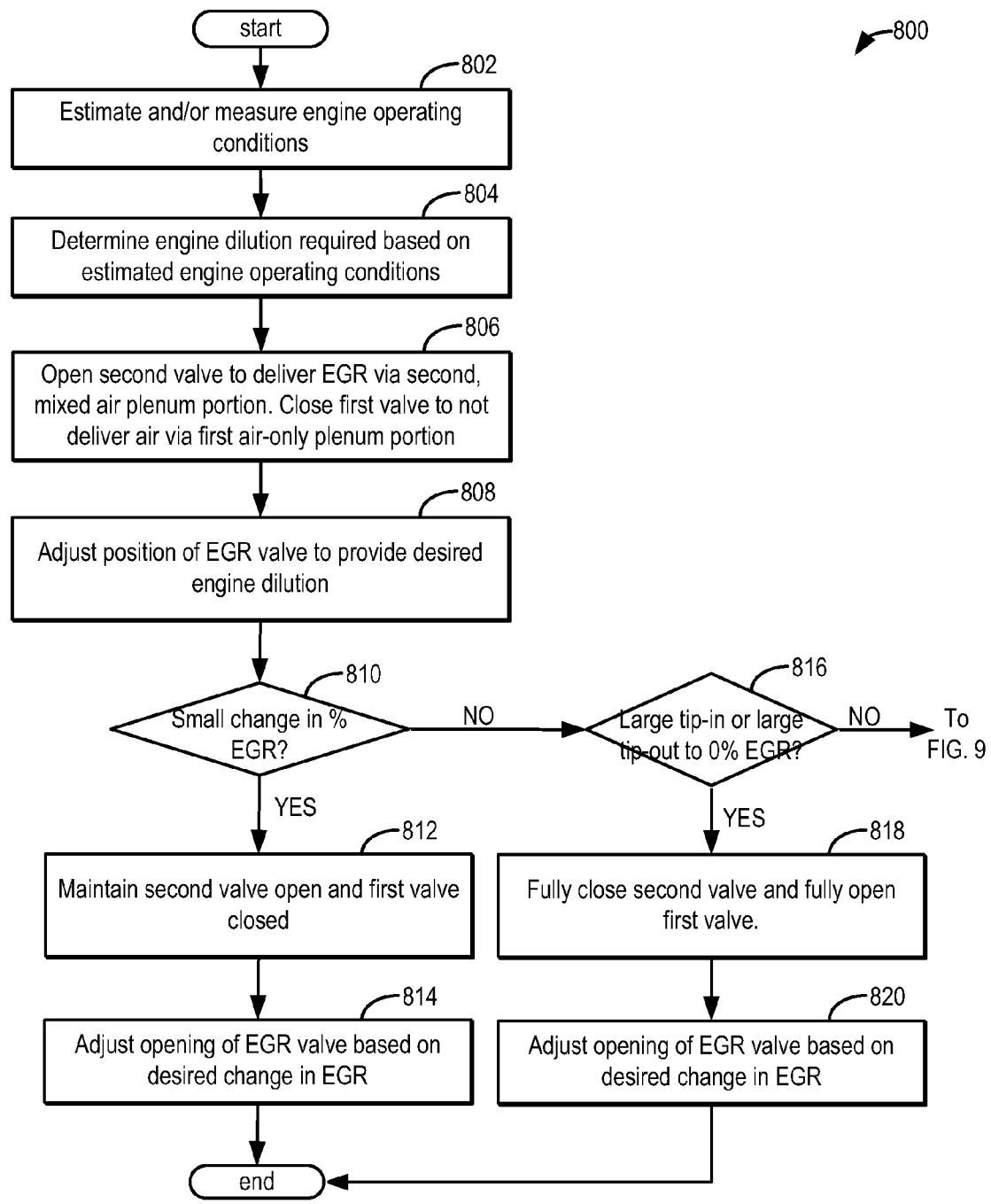
FIGS. 8-9 show high level flow charts for adjusting a ratio of air and exhaust gas delivered to engine cylinders via the divided intake plenum.
Figure 9:
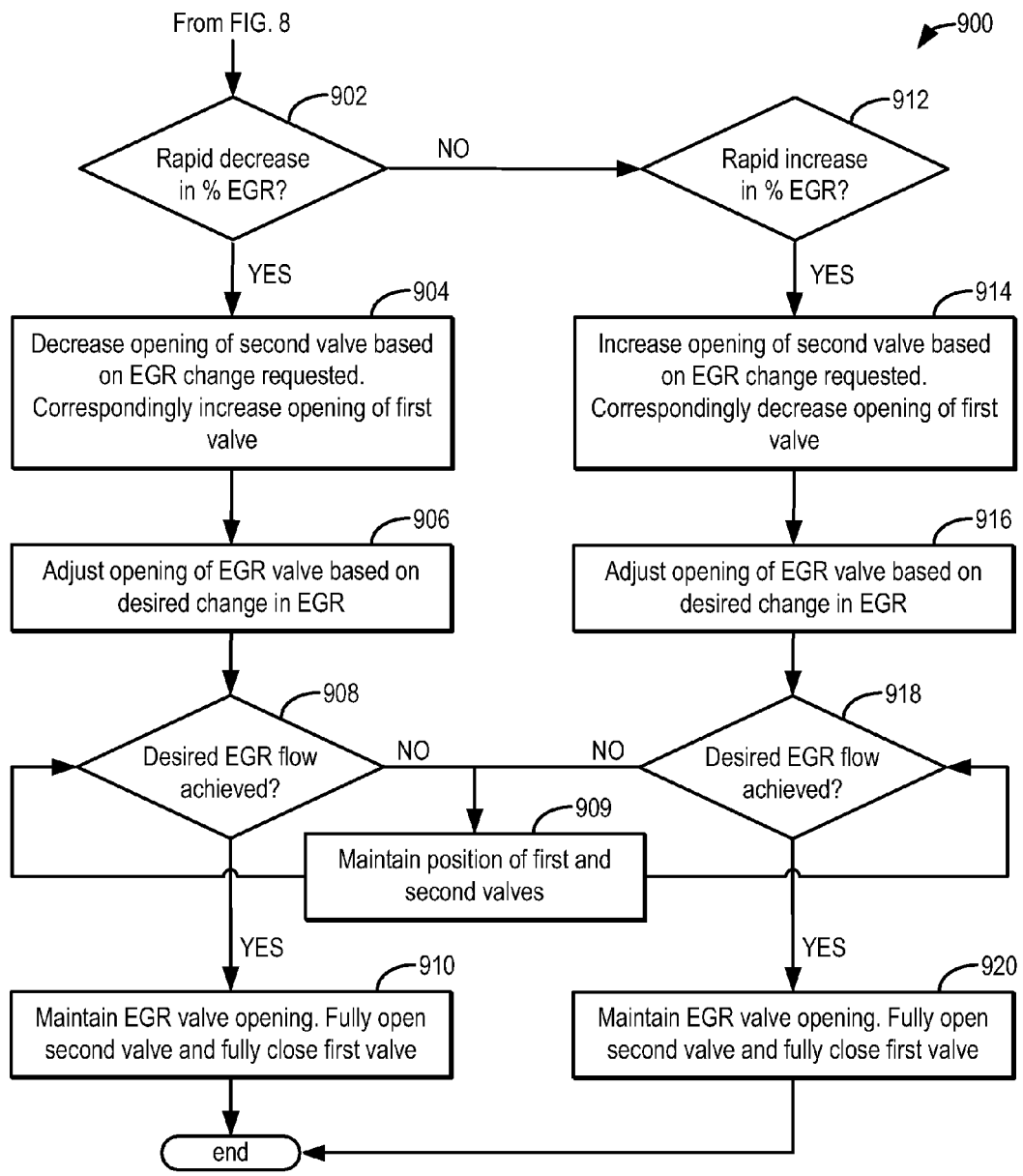
Figure 10:
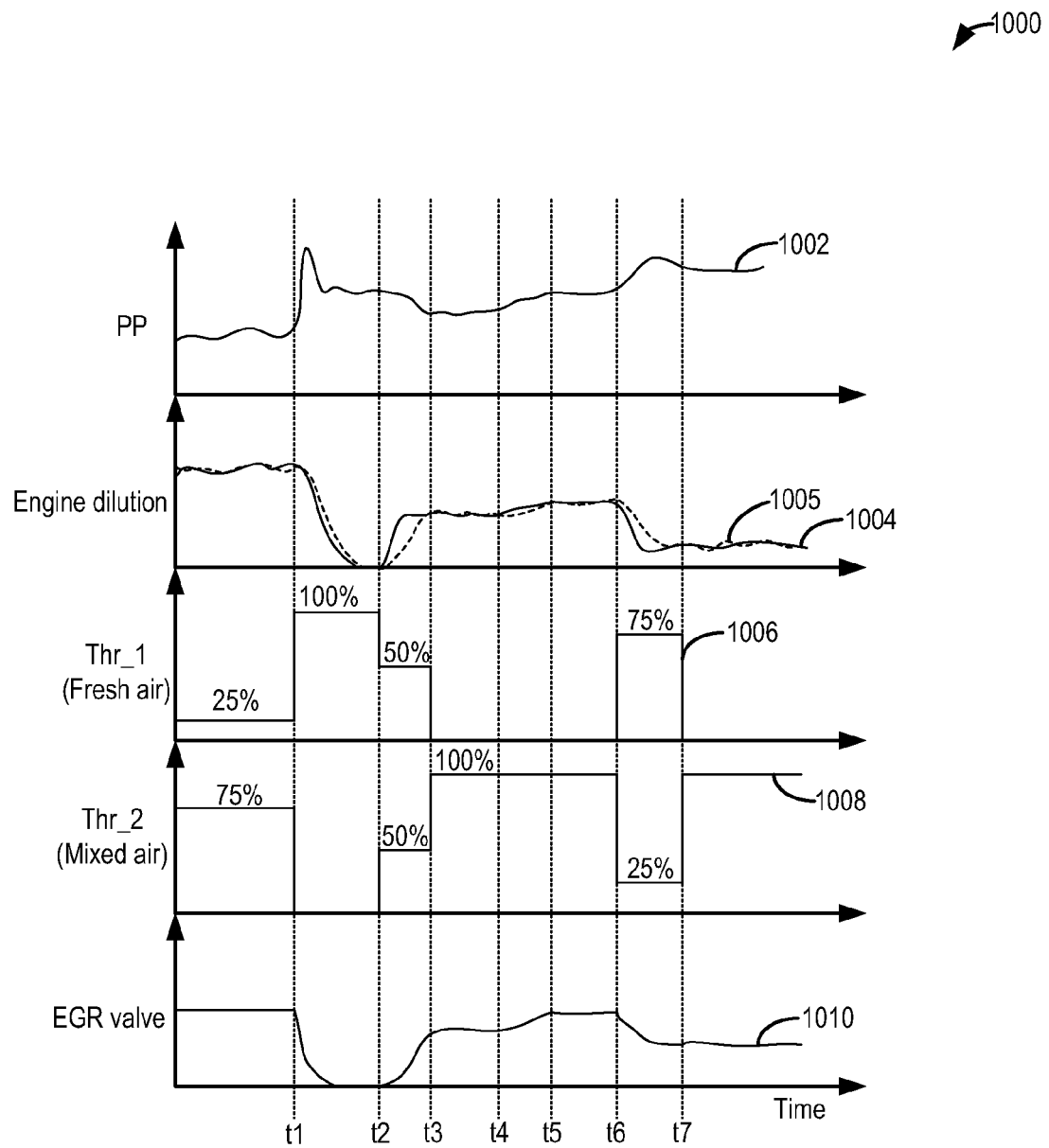
FIG. 10 shows example adjustments of flow delivered to the different plenum portions responsive to changes in EGR demand.

Now turning to FIGS. 8-9, example routines 800 and 900 are shown, respectively, for adjusting delivery of fresh air and exhaust residuals to each engine cylinder in response to a change in engine dilution request via adjustments to the charge flow through each portion of the divided intake plenum. The approach allows for rapid adjustments to the amount of EGR delivered to an engine, improving time to high dilution EGR flow which reduces emissions and improves fuel economy sooner. The approach also improves time to peak torque when EGR needs to be rapidly decreased, and improving EGR purging when EGR needs to be rapidly decreased to a low load. The routines of FIGS. 8-9 may be described with reference to the divided intake plenum embodiment of FIGS. 2-4 wherein the first and second set of throttle valves are oriented 90 degrees relative to each other on a common shaft operated by a common actuator. As such, the routines of FIGS. 8-9 may also be used with the embodiment of the intake plenum described at FIGS. 4-7.

At 802, engine operating conditions may be estimated and/or measured. These may include, for example, ambient temperature and pressure, engine temperature, engine speed, crankshaft speed, operator torque demand, pedal position, fuel tank fuel level, fuel alcohol content, catalyst temperature, boost level, etc.

At 804, based on the estimated engine operating conditions, an engine dilution level required may be determined. For example, at higher speed-load conditions, a lower engine dilution (less EGR) may be requested while at lower speed-load conditions, a higher engine dilution (more EGR) may be requested.

At 806, the routine includes delivering at least intake air into engine cylinders via a first section of a divided intake plenum and delivering at least EGR into the engine cylinders via a second, different, section of the divided intake plenum. A relative flow from each section to the cylinders is then adjusted via valves (such as first and second set of throttle valves) between the plenum and the cylinders. The relative flow is adjusted based on the engine dilution requested. As such, the valves between the plenum and the cylinders may be positioned in intake ports of the cylinders. The valves may include, for each cylinder's intake port, a first throttle valve coupled to the first section, and a second throttle valve coupled to the second section. As an example, at steady-state conditions, or during initialization conditions, such as when 10%-25% EGR is requested, adjusting the relative flow includes closing the first valve while opening the second valve to provide a mixed aircharge to the cylinders. Further, at 808, a position of the EGR valve may be adjusted based on the requested engine dilution to provide EGR into the second section of the intake plenum at the desired composition and flow rate. Thus, by coordinating the opening of the EGR valve with the relative flow between the sections of the divided intake plenum, the desired engine dilution can be provided to the engine cylinders via the second section. In an alternate example, if no engine dilution is requested at initialization, adjusting the relative flow includes opening the first valve while closing the second valve to provide only fresh intake air to the cylinders via the first plenum section.

As discussed with reference to FIG. 2, the first valve and the second valve may be coupled on a common shaft, wherein opening the first valve while closing the second valve includes actuating the common shaft to open the first valve by an amount while closing the second valve by the same (given) amount. Alternatively, as discussed with reference to FIG. 5, the first and second valves may be coupled to distinct actuators. For example, the first valve may coupled to a first shaft in the first section, while the second valve may be coupled to a second shaft in the second section. Therein, opening the first valve while closing the second valve may include actuating the first shaft to open the first valve by a first amount while actuating the second shaft to close the second valve by a second amount, the second amount different (e.g., more or less) than the first amount. Further, the first valve may be actuated at a different rate than the second valve. For example, the first valve may be actuated faster while the second valve is actuated slower, or vice versa.

Further adjustments to the relative flow of charge from each of the first and second sections into the engine cylinders may be made based on change in EGR demand, as engine operating conditions change. For example, as elaborated below, in response to transient changes from the steady state or initialization conditions, which lead to a corresponding change in EGR demand (including an increase in EGR demand or a decrease in EGR demand), adjustments may be made to the degree of opening of the first and second valves.

Specifically, at 810, it may be determined if there is a small and slow change in EGR percentage. The small change in EGR percentage may include a small and slow increase or a small and slow decrease in EGR percentage. In one example, a small or smooth change in engine load, such as due to a small and/or slow tip-out or tip-in, may result in a small requested change in EGR percentage. Herein, the absolute change in pedal position may be less than a threshold amount, and the rate of change in the pedal position may be less than a threshold rate. Furthermore, the change in EGR percentage may be less than a threshold percentage.

If a small change in EGR percentage is confirmed, then at 812, the routine includes maintaining the valve positions. For example, in response to a smooth increase in EGR demand, the routine includes maintaining the first valve closed to reduce flow of fresh air into the cylinders while maintaining the second valve open to continue flowing mixed air (fresh air and exhaust residuals) into the cylinders. At 814, the routine further includes adjusting a position of the EGR valve based on the change in EGR demand. For example, the EGR valve opening may be increased in response to the smaller increase in EGR demand. In this way, the EGR valve position may be adjusted to support the total desired EGR percentage.

If a smooth change in EGR percentage is not confirmed, the routine moves to 816 to confirm a large tip-in or large tip-out. In one example, responsive to the large tip-in or large tip-out, 0% EGR conditions may be requested substantially immediately. The large tip-in may include, for example, a tip-in to wide open throttle (WOT) position. Likewise, the large tip-out may include complete release of an accelerator pedal. Herein, the absolute change in pedal position may be more than the threshold amount. Furthermore, the change in EGR percentage may be more than the threshold percentage.

In response to the larger decrease in EGR demand to 0% EGR conditions, the routine includes, at 818, fully opening the first valve to increase flow of fresh air into the cylinders while fully closing the second valve open to reduce flowing mixed air (fresh air and exhaust residuals) into the cylinders. As a result of closing the second valve, EGR is contained in the closed-off section only, and not delivered into the engine cylinders, allowing for a rapid drop in engine dilution. In one example, the closing of the second valve may be delayed from, or performed slower than, the opening of the first valve so as to maximize the amount of air entering the cylinders while reducing combustion stability issues arising from sudden changes in EGR. By adjusting and coordinating the opening and closing of the first and second valves, relative flow of air and exhaust residuals from each of the first and second intake plenum sections into the engine cylinders can be adjusted responsive to the requested change in EGR. Then, at 820, a position of the EGR valve may be adjusted based on the change in EGR demand and the adjusted relative flow from each of the first and second intake plenum sections. For example, in response to the large tip-in or tip-out, following the closing of the second valve and opening of the first valve, the EGR valve opening may be reduced (e.g., fully closed).

In an alternate example, after closing the second valve to contain the EGR in the second plenum section, the opening of the EGR valve may be adjusted to a position based on an expected subsequent increase in EGR demand. That is, the EGR valve may be prepositioned so that when there is a subsequent increase in EGR demand, the second valve can be opened and exhaust residuals can be quickly delivered to the cylinders via the second intake plenum section at a desired EGR rate.

If a large tip-in or tip-out to substantially zero percent EGR conditions is not confirmed, then the routine moves to FIG. 9 where routine 900 performs adjustments to each of the first and second intake plenum throttle valves, as well as the EGR valve responsive to rapid and/or larger changes in EGR percentage.

Specifically, at 902, the routine includes confirming a rapid and/or larger decrease in EGR percentage. For example, the rapid decrease in EGR percentage may include a drop in EGR percentage from high EGR to medium EGR conditions. The larger decrease in EGR percentage may be to a lower EGR percentage, but not to 0% EGR conditions. As an example, the larger decrease in EGR percentage may be responsive to an operator tip-in to less than wide open throttle (WOT) position. Herein, the decrease in EGR percentage may be more than a threshold percentage.

In response to the rapid decrease in EGR percentage, at 904, the routine includes partially opening the first valve while partially closing the second valve, each of the partially opening and the partially closing based on the requested decrease in EGR demand. That is, the opening of the second valve may be decreased while the opening of the first valve may be increased based on the requested change in EGR. As an example, in response to a rapid transition in demand from 28% EGR to 14% EGR (that is, a 50% decrease in EGR demand), the second valve may be transitioned from being 100% open to being 50% open, while the first valve may be transitioned from being 100% closed to being 50% closed. Next, at 906, a position of the EGR valve may be adjusted based on the change in EGR demand and the adjusted relative flow between the first and second intake plenum sections. For example, the EGR valve opening may be adjusted to support the desired percentage mixture in the second section only. This may include increasing or decreasing the EGR valve opening.

At 908, it may be determined if the desired EGR flow has been achieved. If not, the controller may maintain the position of the first and second valves at 909. After the EGR flow is at the desired EGR flow, at 910, the routine includes maintaining the position of the EGR valve while fully closing the partially open first valve and fully opening the partially closed second valve. That is, once the desired EGR flow is achieved in the second intake plenum section, flow through the first section is closed (since no further fresh air is required) and flow through the second section is fully opened. The desired engine dilution is then delivered at the desired EGR flow to the engine cylinders via the second section of the divided intake plenum. In this way, the adjustments to the first and second throttle valve allow relative flow between the first and second sections to be adjusted and the rapid decrease in EGR demand to be provided faster.

If a rapid decrease in EGR percentage is not confirmed at 902, then at 912, the routine includes confirming a rapid and/or larger increase in EGR percentage. For example, the rapid increase in EGR percentage may include a rise in EGR percentage from medium EGR to high EGR conditions, or from low EGR to medium EGR conditions. As an example, the larger increase in EGR percentage may be responsive to an operator tip-in to less than wide open throttle (WOT) position or an operator tip-out which does not include total release of the accelerator pedal. Herein, the increase in EGR percentage may be more than the threshold percentage.

In response to the request for a rapid increase in EGR percentage, at 914, the routine includes partially opening the second valve while partially closing the first valve, each of the partially opening and the partially closing based on the requested increase in EGR demand. That is, the opening of the second valve may be increased while the opening of the first valve may be decreased based on the requested change in EGR. As an example, in response to a rapid transition in demand from 14% EGR to 28% EGR (that is, a 50% increase in EGR demand), the second valve may be transitioned from being 100% closed to being 50% open, while the first valve may be transitioned from being 100% open to being 50% closed. Next, at 916, a position of the EGR valve may be adjusted based on the change in EGR demand and the adjusted relative flow between the first and second intake plenum sections. For example, the EGR valve opening may be adjusted to support the desired percentage mixture in the second section only. This may include increasing or decreasing the EGR valve opening.

At 918, it may be determined if the desired EGR flow has been achieved. If not, the controller may maintain the position of the first and second valves at 909. After the EGR flow is at the desired EGR flow, at 920, the routine includes maintaining the position of the EGR valve while fully closing the partially closed first valve and fully opening the partially open second valve. That is, once the desired EGR flow is achieved in the second intake plenum section, flow through the first section is closed (since no further fresh air is required) and flow through the second section is fully opened. The desired engine dilution is then delivered with the desired EGR flow to the engine cylinders via the second section of the divided intake plenum. In this way, the adjustments to the first and second throttle valve allow relative flow between the first and second sections to be adjusted and the rapid increase in EGR demand to be provided faster.

In this way, a method for an engine is provided comprising drawing only fresh intake air into a first portion of a plenum via a first inlet and distributing the fresh intake air to a plurality of outlet ports coupled to distinct engine cylinders. The method further includes drawing exhaust gas into a second portion of the plenum via a second inlet and distributing the exhaust gas to the plurality of outlet ports, the first and second plenum portions divided from one another from the inlets to the outlet ports. The method further includes throttling flow at the plurality of outlet ports to vary a ratio of exhaust to fresh air in the cylinders. Herein, each of the first inlet and the second inlet are located at an upstream end of the plenum, and the plurality of outlet ports are located at a downstream end of the plenum. Throttling flow at the plurality of outlet ports includes adjusting a first set of throttle valves located in the plurality of outlet ports and coupled to the first plenum portion while adjusting a second set of throttle valves located in the plurality of outlet ports and coupled to the second plenum portion, the first and second set of throttle valves aligned perpendicular to each other on a common shaft. For example, throttling flow may include actuating the common shaft to increase an opening of the second set of throttle valves while decreasing an opening of the first set of throttle valves to increase the ratio of exhaust to fresh air in the cylinders; and actuating the common shaft to decrease an opening of the second set of throttle valves while increasing an opening of the first set of throttle valves to decrease the ratio of exhaust to fresh air in the cylinders.

An example adjustment is now shown with reference to FIG. 10. Specifically, map 1000 of FIG. 10 depicts pedal position at 1002, engine dilution (demanded versus delivered) at plots 1004 and 1005, position of first set of throttle valves coupled to a first plenum portion (for delivering fresh air) at plot 1006, position of second set of throttle valves coupled to a second plenum portion (for delivering mixed air) at plot 1008, and an EGR valve position at plot 1010. In the depicted example, the first and second set of throttle valves are mechanically coupled such that the opening of one is tied to the closing of the other.

Prior to t1, the engine may be operating with a high engine dilution requirement (plot 1004) based on engine operating conditions (plot 1002). To provide the higher dilution demand, the EGR valve may be partially opened (plot 1010). In addition, relative flow from the first and second plenum sections may be adjusted to provide relatively more mixed air flow via the second plenum section and relatively less fresh air flow via the first plenum section. In particular, the relative flow may be adjusted by opening the first set of throttle valves to a 25% open position while opening the second set of throttle valves to a 75% open position. The coordination of the opening of the first and second throttle set of valves and the EGR valves allows the engine dilution demand to be met (plot 1005).

At t1, in response to a large operator pedal tip-in, 0% EGR conditions may be demanded substantially immediately. In response to the demand for 0% EGR, at t1, the first set of throttle valves are immediately shifted to a fully open position while the second set of throttle valves are immediately shifted to a fully closed position. As a result, EGR is contained in the second plenum section and their delivery to the engine cylinders is reduced while concurrently delivery of fresh air into the engine cylinders from the first plenum section is increased. Also, the opening of EGR valve is reduced. Consequently, between t1 and t2, engine dilution may drop and reach the desired 0% EGR conditions.

At t2, due to a change in pedal position, a rapid increase in engine dilution is demanded. Specifically, a 50% increase in engine dilution is demanded. To expedite delivery of the demanded engine dilution, at t2, the first set of throttle valves are shifted from the fully open position to a partially open (50% open) position to reduce the ratio of fresh air received in the engine cylinders from the first plenum portion. At the same time, the second set of throttle valves are shifted from the fully closed position to a partially open (50% open) position to increase the ratio of mixed air received in the engine cylinders from the second plenum portion. Also, an opening of the EGR valve is increased to increase the amount of exhaust residuals in the mixed air delivered via the second plenum portion. Between t2 and t3, the engine dilution increases and the EGR flow rate increases. At t3, the EGR flow in the second plenum portion is at the desired flow. Thus, at t3, while maintaining the position of the EGR valve, the second set of throttle valves are shifted from the partially open position to a fully open position to deliver mixed air with the desired engine dilution and EGR flow into the engine cylinders from the second plenum portion. Concurrently, the first set of throttle valves are shifted from the partially open position to a fully closed position to stop delivery of fresh air into the engine cylinders from the first plenum portion. The position of the valves is then maintained.

Between t4 and t5, there may be a small and smooth increase in engine dilution demand. In response to the smooth change in engine dilution demand, the position of the first and second set of throttle valves may be maintained while a position of the EGR valve is adjusted to vary (herein increase) the amount of exhaust residuals in the composition of the mixed air delivered to the engine cylinders via the second plenum portion. The position of the valves is then maintained.

At t6, due to a change in pedal position, a rapid decrease in engine dilution is demanded. Specifically, a 75% decrease in engine dilution is demanded. To expedite delivery of the demanded engine dilution, at t6, the first set of throttle valves are shifted from the fully closed position to a partially open (75% open) position to increase the ratio of fresh air received in the engine cylinders from the first plenum portion. At the same time, the second set of throttle valves are shifted from the fully open position to a partially open (25% open) position to decrease the ratio of mixed air received in the engine cylinders from the second plenum portion. Also, an opening of the EGR valve is decreased to decrease the amount of exhaust residuals in the mixed air delivered via the second plenum portion. Between t6 and t7, the engine dilution decreases and the EGR flow rate decreases. At t7, the EGR flow in the second plenum portion is at the desired flow. Thus, at t7, while maintaining the position of the EGR valve, the second set of throttle valves are shifted from the partially open position to a fully open position to deliver mixed air with the desired engine dilution and EGR flow into the engine cylinders from the second plenum portion. Concurrently, the first set of throttle valves are shifted from the partially open position to a fully closed position to stop delivery of fresh air into the engine cylinders from the first plenum portion. The position of the valves is then maintained.

In one example, an engine system comprises a divided engine intake plenum including a divider for dividing the intake plenum into first and second plenum portions; a first, upper plenum portion having a first inlet for drawing fresh air and a plurality of outlets coupled to distinct engine cylinders for delivery the fresh air to the engine cylinders; and a second, lower plenum portion having a second inlet for drawing fresh air, a third inlet positioned downstream of the second inlet for drawing exhaust gas from an EGR passage; and a plurality of outlets coupled to the distinct engine cylinders for delivering a mixture the fresh air and the exhaust gas to the engine cylinders. The engine system further includes a first set of throttle valves configured on an actuatable shaft and coupled to the plurality of outlets of the first plenum portion; a second set of throttle valves configured on the actuatable shaft and oriented perpendicular to the first set of throttle valves, the second set of throttle valves coupled to the plurality of outlets of the second plenum portion; and an EGR valve coupled in the EGR passage, upstream of the third inlet, for adjusting an amount of exhaust residuals delivered to the second plenum portion. An engine controller having non-transitory memory may be configured with computer readable instructions for: in response to an increase in EGR demand, opening the EGR valve; and adjusting a position of the actuatable shaft to fully open the second set of throttle valves and increase throttled flow to the engine cylinders via the second plenum portion while fully closing the first set of throttle valves to decrease throttled flow into the engine cylinders via the first plenum portion.

The controller may include further instructions for: in response to a larger decrease in EGR demand, closing the EGR valve; and adjusting a position of the actuatable shaft to fully open the first set of throttle valves and increase throttled flow to the engine cylinders via the first plenum portion while fully closing the second set of throttle valves to decrease throttled flow into the engine cylinders via the second plenum portion. The controller may also, in response to a smaller decrease in EGR demand, adjust a position of the actuatable shaft to increase an opening of the first set of throttle valves while decreasing an opening of the second set of throttle valves; then reduce an opening of the EGR valve. Then, when a desired EGR flow rate is reached, the controller may maintain the opening of the EGR valve while adjusting the position of the actuatable shaft to fully close the first set of throttle valves and fully open the second set of throttle valves.

In this way, rather than just controlling the EGR flow into an intake manifold, a system is provided that directly controls the flow of an air-EGR mixture through one half of a divided intake manifold while also controlling the flow of only air through the other half of the divided intake manifold. By coordinating the decrease in delivery of EGR and increase in delivery of fresh air to engine cylinders via throttle valves coupled to distinct sections of the same intake plenum, a delay to reach a higher torque is reduced without requiring any reduction in peak EGR dilution to protect for performance and combustion stability. Likewise, by coordinating the increase in delivery of EGR and decrease in delivery of fresh air to engine cylinders via throttle valves coupled to the distinct sections of the same intake plenum, higher engine dilution levels can be achieved. By extending the range of engine operation over which EGR benefits can be achieved, fuel efficiency is increased. Overall, engine performance and exhaust emissions are improved.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
   delivering at least intake air into engine cylinders via a first section of a divided intake plenum;
   delivering at least EGR into the engine cylinders via a second, different, section of the divided intake plenum, wherein the first and second sections of the divided intake plenum are separated by a divider inside the divided intake plenum, the divider spanning an entire length of the divided intake plenum from upstream of an EGR passage to intake ports of the cylinders; and
   adjusting relative flow from the first section to the cylinders via a first set of throttle valves and from the second section to the cylinders via a second set of throttle valves, the first and second sets of throttle valves arranged in a perpendicular arrangement on a common shaft, the common shaft configured perpendicular to a plane of the divider.

2. The method of claim 1, wherein the first and second sets of throttle valves between the plenum and the cylinders are positioned in the intake ports of the cylinders, wherein the divider is perpendicular to a ground plane in the intake ports and parallel to the ground plane in a remainder of the plenum.

3. The method of claim 2, wherein the first set of throttle valves includes, for each engine cylinder, a first throttle valve coupled to the first section, and wherein the first set of throttle valves includes a second throttle valve coupled to the second section, and wherein each first throttle valve of the first set of throttle valves and each second throttle valve of the second set of throttle valves is actuated by a common actuator.

4. The method of claim 3, wherein the adjusting relative flow includes actuating the common actuator to open each first throttle valve of the first set of throttle valves while closing each second throttle valve of the second set of throttle valves, or close each first throttle valve of the first set of throttle valves while opening each second throttle valve of the second set of throttle valves.

5. The method of claim 4, wherein the actuating includes actuating the common shaft via the common actuator to open the first set of throttle valves by an amount while closing the second set of throttle valves by said amount.

6. The method of claim 2, wherein the intake plenum has an inlet at an upstream end for drawing in fresh intake air, the inlet upstream of a location where the EGR passage is coupled to the intake plenum, and an outlet coupled to the intake port of the cylinders at a downstream end, and wherein the divider spans the intake plenum from the inlet to the outlet, the divider dividing the plenum into upper and lower portions from the inlet to the outlet.

7. The method of claim 6, wherein the first section is one of the upper and lower portions and wherein the second section is a remaining one of the upper and lower portions.

8. The method of claim 4, wherein the adjusting is responsive to a change in EGR demand, the change in EGR demand including one of an increase in EGR demand and a decrease in EGR demand.

9. The method of claim 8, wherein the increase in EGR demand is responsive to an operator pedal tip-in to less than wide open throttle, and wherein the decrease in EGR demand is responsive to one of an operator pedal tip-in to wide open throttle and an operator pedal tip-out.

10. The method of claim 9, wherein the second section is coupled to an outlet of the EGR passage while the first section is not coupled to the outlet of the EGR passage, and wherein the EGR passage includes an EGR valve for adjusting an amount of exhaust residuals recirculated from an engine exhaust manifold into the second section of the intake plenum.

11. The method of claim 10, wherein the adjusting includes:
    in response to a smaller increase in EGR demand, maintaining positions of each of the first and the second set of throttle valves;
    in response to a larger increase in EGR demand, fully closing the first set of throttle valves while fully opening the second set of throttle valves;
    in response to a larger decrease in EGR demand, fully opening the first set of throttle valves while fully closing the second set of throttle valves; and
    in response to a smaller decrease in EGR demand, partially opening the first set of throttle valves while partially closing the second set of throttle valves, each of the partially opening and the partially closing based on the smaller decrease in EGR demand.

12. The method of claim 11, further comprising:
    adjusting a position of the EGR valve based on the change in EGR demand and the adjusting the relative flow from each of the first section and the second section of the divided intake plenum.

13. The method of claim 12, further comprising:
    in response to the smaller decrease in EGR demand, after EGR flow is at a desired EGR flow,
        fully closing the partially open first set of throttle valves while fully opening the partially closed second set of throttle valves.

14. A method for an engine, comprising:
    drawing only fresh intake air into a first portion of a plenum via a first inlet located downstream of an intake throttle and upstream of an EGR passage and distributing the fresh intake air to a plurality of outlet ports coupled to distinct engine cylinders;
    drawing exhaust gas into a second portion of the plenum via a second inlet located downstream of the intake throttle and upstream of the EGR passage and distributing the exhaust gas to the plurality of outlet ports, the first and second plenum portions divided from one another along an entire length of the plenum from the inlets to the outlet ports via a divider inside the plenum; and
    throttling flow at the plurality of outlet ports via a first set of throttle valves coupled to the first portion and a second set of throttle valves coupled to the second portion to vary a ratio of exhaust to fresh air in the cylinders, the first and second sets of throttle valves aligned perpendicular to each other on a common shaft, and wherein the common shaft is arranged perpendicular to a plane of the divider.

15. The method of claim 14, wherein the throttling flow includes:

actuating the common shaft via a common actuator to increase an opening of the second set of throttle valves while decreasing an opening of the first set of throttle valves to increase the ratio of exhaust to fresh air in the cylinders while maintaining a position of an EGR valve; and actuating the common shaft via the common actuator to decrease an opening of the second set of throttle valves while increasing an opening of the first set of throttle valves to decrease the ratio of exhaust to fresh air in the cylinders while closing the EGR valve.

16. An engine system, comprising:

a divided engine intake plenum leading to intake ports of distinct engine cylinders, the divided intake plenum including:
- a divider dividing an entire length on an inside of the intake plenum into a first, upper and a second, lower plenum portion, wherein the divider is perpendicular to a ground plane in the intake ports and parallel to the ground plane in a remainder of the intake plenum;
- the first, upper plenum portion having a first inlet for drawing fresh air and a plurality of outlets coupled to the distinct engine cylinders for delivering the fresh air to the engine cylinders; and
- the second, lower plenum portion having a second inlet for drawing fresh air, a third inlet positioned downstream of the second inlet for drawing exhaust gas from an EGR passage; and a plurality of outlets coupled to the distinct engine cylinders for delivering a mixture of the fresh air and the exhaust gas to the engine cylinders;

a first set of throttle valves configured on a common actuatable shaft and coupled to the plurality of outlets of the first plenum portion, wherein the common shaft is arranged perpendicular to a plane of the divider;

a second set of throttle valves configured on the common actuatable shaft and oriented perpendicular to the first set of throttle valves, the second set of throttle valves coupled to the plurality of outlets of the second plenum portion;

an EGR valve coupled in the EGR passage, upstream of the third inlet, for adjusting an amount of exhaust residuals delivered to the second plenum portion; and a controller having non-transitory memory with computer readable instructions for:
- in response to an increase in EGR demand,
  - opening the EGR valve; and
  - adjusting a position of the common actuatable shaft to fully open the second set of throttle valves and increase throttled flow to the engine cylinders via the second plenum portion while concurrently fully closing the first set of throttle valves to decrease throttled flow into the engine cylinders via the first plenum portion.

17. The system of claim 16, wherein the controller includes further instructions for:
- in response to a larger decrease in EGR demand,
  - closing the EGR valve; and
  - adjusting a position of the common actuatable shaft to fully open the first set of throttle valves and increase throttled flow to the engine cylinders via the first plenum portion while fully closing the second set of throttle valves to decrease throttled flow into the engine cylinders via the second plenum portion.

18. The system of claim 17, wherein the controller includes further instructions for:
- in response to a smaller decrease in EGR demand,
  - adjusting a position of the common actuatable shaft to increase an opening of the first set of throttle valves while decreasing an opening of the second set of throttle valves;
  - then reducing an opening of the EGR valve; and
  - when a desired EGR flow rate is reached,
    - maintaining the opening of the EGR valve while adjusting the position of the common actuatable shaft to fully close the first set of throttle valves and fully open the second set of throttle valves.

* * * * *